(12) United States Patent
Bayyouk et al.

(10) Patent No.: US 11,585,455 B2
(45) Date of Patent: Feb. 21, 2023

(54) VALVE SEATS FOR USE IN FRACTURING PUMPS

(71) Applicant: SPM Oil & Gas Inc., Fort Worth, TX (US)

(72) Inventors: Jacob A. Bayyouk, Richardson, TX (US); Keith Peach, Glasgow (GB)

(73) Assignee: SPM Oil & Gas Inc., Fort Worth, TX (US)

( * ) Notice: Subject to any disclaimer, the term of this patent is extended or adjusted under 35 U.S.C. 154(b) by 457 days.

(21) Appl. No.: 16/880,773

(22) Filed: May 21, 2020

(65) Prior Publication Data
US 2020/0284365 A1  Sep. 10, 2020

Related U.S. Application Data

(60) Continuation of application No. 16/026,732, filed on Jul. 3, 2018, now Pat. No. 10,663,071, which is a (Continued)

(51) Int. Cl.
*F16K 25/00* (2006.01)
*F16K 1/42* (2006.01)
(Continued)

(52) U.S. Cl.
CPC .......... *F16K 25/005* (2013.01); *F04B 1/0452* (2013.01); *F04B 53/10* (2013.01);
(Continued)

(58) Field of Classification Search
CPC .......... F16K 25/005; F16K 1/42; F16K 1/465; F16K 15/063; F04B 1/0452; F04B 53/10; F04B 53/1087
(Continued)

(56) References Cited

U.S. PATENT DOCUMENTS 1,517,883 A   12/1924   Alleman
1,553,171 A    9/1925   Jones
(Continued)

FOREIGN PATENT DOCUMENTS

AU    9517960 A    11/1995
CA      152227     12/1913
(Continued)

OTHER PUBLICATIONS

Advisory Action dated Oct. 10, 2013, by the USPTO, re U.S. Appl. No. 13/445,513.
(Continued)

*Primary Examiner* — John Bastianelli
(74) *Attorney, Agent, or Firm* — Foley & Lardner LLP

(57) ABSTRACT

A valve assembly for use in a fracturing pump including a valve member movable into and out of engagement with a valve seat body. The valve seat body includes an outer surface and an inner surface, the inner surface forming a fluid bore extending between a first end and a second end of the valve seat body. The body further includes a seating surface extending radially from the inner surface and facing the valve member, the seating surface having a recessed area. An insert is disposed in the recessed area forming at least a portion of the inner surface and at least portion of the seating surface. The valve seat body first end has a diameter different from a diameter valve seat body second. The difference between diameters allows the valve seat body outer surface to be supported by the fluid passageway.

20 Claims, 5 Drawing Sheets

Related U.S. Application Data continuation of application No. 15/814,501, filed on Nov. 16, 2017, now Pat. No. 10,753,495, which is a division of application No. 14/555,020, filed on Nov. 26, 2014, now Pat. No. 9,822,894.

(60) Provisional application No. 61/909,197, filed on Nov. 26, 2013.

(51) Int. Cl.

| | |
|---|---|
| *F16K 1/46* | (2006.01) |
| *F04B 1/0452* | (2020.01) |
| *F04B 53/10* | (2006.01) |
| *F16K 15/06* | (2006.01) |

(52) U.S. Cl.
CPC ............ *F04B 53/1087* (2013.01); *F16K 1/42* (2013.01); *F16K 1/465* (2013.01); *F16K 15/063* (2013.01)

(58) Field of Classification Search
USPC ........................ 251/332–334, 359–365, 368
See application file for complete search history.

(56) References Cited

U.S. PATENT DOCUMENTS

| | | |
|---|---|---|
| 1,652,857 A | 12/1927 | Greve |
| 1,671,139 A | 5/1928 | Wilson |
| 1,687,008 A * | 10/1928 | Deakins .............. F04B 53/1025 137/906 |
| 1,705,789 A | 3/1929 | Steirly |
| 1,707,017 A | 3/1929 | Kibele |
| 1,726,187 A | 8/1929 | Mahan |
| 1,908,899 A | 5/1933 | Kayel |
| 1,914,737 A | 6/1933 | Elms |
| 1,948,628 A | 2/1934 | Penick et al. |
| 1,966,264 A | 7/1934 | Roye |
| 1,987,784 A | 1/1935 | McDonald |
| 2,421,276 A | 5/1947 | Lotz |
| 2,475,040 A | 7/1949 | Mandl |
| 2,573,567 A | 10/1951 | Hancock |
| 2,602,434 A | 7/1952 | Barnaby |
| 2,623,276 A | 12/1952 | Anderson |
| 2,665,675 A | 1/1954 | Sheppard |
| 2,753,859 A | 7/1956 | Bartlett |
| 2,898,082 A | 8/1959 | Von Almen et al. |
| 2,903,235 A | 9/1959 | Rodgers et al. |
| 2,969,951 A | 1/1961 | Walton |
| 2,982,515 A | 5/1961 | Rule |
| 2,983,281 A | 5/1961 | Bynum |
| 3,029,501 A | 4/1962 | Leathers |
| 3,063,467 A | 11/1962 | Roberts, Jr. et al. |
| 3,114,644 A | 12/1963 | Peterson |
| 3,191,905 A | 6/1965 | Brown |
| 3,387,353 A | 6/1968 | Romero |
| 3,474,808 A | 10/1969 | Elliott |
| 3,489,170 A | 1/1970 | Leman |
| 3,628,921 A | 12/1971 | Hill |
| 3,801,234 A | 4/1974 | Love et al. |
| 3,808,666 A | 5/1974 | Bales, Sr. |
| 3,830,255 A | 8/1974 | Freiheit |
| 3,952,393 A | 4/1976 | Van Ravenzwaay et al. |
| 3,990,139 A | 11/1976 | Touchet |
| 4,076,212 A | 2/1978 | Leman |
| 4,077,102 A | 3/1978 | Smith |
| 4,103,663 A | 8/1978 | Elsbett et al. |
| 4,192,520 A | 3/1980 | Hasegawa |
| 4,257,163 A | 3/1981 | Bauer |
| 4,285,126 A | 8/1981 | Irwin |
| 4,432,386 A | 2/1984 | Pacht |
| 4,518,329 A | 5/1985 | Weaver |
| 4,530,322 A | 7/1985 | Yamada et al. |
| 4,662,392 A | 5/1987 | Vadasz |
| 4,675,966 A | 6/1987 | Franco-Ferreira et al. |
| 4,699,169 A | 10/1987 | Sherby |
| 4,732,364 A | 3/1988 | Seger et al. |
| 4,763,876 A | 8/1988 | Oda et al. |
| 4,770,206 A | 9/1988 | Sjoberg |
| 4,860,995 A | 8/1989 | Rogers |
| 4,878,815 A | 11/1989 | Stachowiak |
| 4,922,957 A | 5/1990 | Johnson |
| 4,928,726 A | 5/1990 | Johnson et al. |
| 4,951,707 A | 8/1990 | Johnson |
| 4,951,920 A | 8/1990 | Tsuno |
| 5,020,490 A | 6/1991 | Seko |
| 5,052,435 A | 10/1991 | Crudup et al. |
| 5,060,374 A | 10/1991 | Findlanl et al. |
| 5,088,521 A | 2/1992 | Johnson |
| 5,117,546 A | 6/1992 | Lawrence et al. |
| 5,193,577 A | 3/1993 | De Koning |
| 5,211,198 A | 5/1993 | Tinholt |
| 5,234,322 A | 8/1993 | Daniels et al. |
| 5,249,600 A | 10/1993 | Blume |
| 5,345,965 A | 9/1994 | Blume |
| 5,431,186 A | 7/1995 | Blume |
| 5,505,530 A | 4/1996 | Kramer et al. |
| 5,533,245 A | 7/1996 | Stanton |
| 5,616,009 A | 4/1997 | Birdwell |
| 5,816,497 A | 10/1998 | Leon et al. |
| 5,876,189 A | 3/1999 | Lukas et al. |
| 6,073,886 A | 6/2000 | Jakubowski, Jr. et al. |
| 6,195,863 B1 | 3/2001 | Blake |
| 6,227,225 B1 | 5/2001 | Domingue |
| 6,382,940 B1 | 5/2002 | Blume |
| 6,435,475 B1 | 8/2002 | Blume |
| 6,623,259 B1 | 9/2003 | Blume |
| 6,641,112 B2 | 11/2003 | Antoff et al. |
| 6,641,115 B1 | 11/2003 | Bainter |
| 6,679,477 B1 | 1/2004 | Blume |
| 6,695,007 B2 | 2/2004 | Vicars |
| 6,701,955 B2 | 3/2004 | McIntire et al. |
| 6,910,871 B1 | 6/2005 | Blume |
| 6,955,181 B1 | 10/2005 | Blume |
| 6,955,339 B1 | 10/2005 | Blume |
| 7,000,632 B2 | 2/2006 | McIntire et al. |
| 7,011,111 B2 | 3/2006 | Spiegl et al. |
| 7,168,440 B1 | 1/2007 | Blume |
| 7,172,175 B2 | 2/2007 | Vicars |
| 7,222,837 B1 | 5/2007 | Blume |
| 7,296,591 B2 | 11/2007 | Moe et al. |
| 7,335,002 B2 | 2/2008 | Vicars |
| 7,341,435 B2 | 3/2008 | Vicars |
| 7,513,483 B1 | 4/2009 | Blume |
| 7,540,470 B1 | 6/2009 | Blume |
| 7,726,026 B1 | 6/2010 | Blume |
| 7,748,095 B1 | 7/2010 | Phane |
| 7,832,071 B2 | 11/2010 | Klann |
| 7,845,413 B2 | 12/2010 | Shampine et al. |
| 8,147,227 B1 | 4/2012 | Blume |
| 8,191,575 B2 | 6/2012 | Krug, Jr. et al. |
| D682,989 S | 5/2013 | Eagle |
| 8,496,224 B1 | 7/2013 | Gilstad et al. |
| D700,682 S | 3/2014 | Bayyouk et al. |
| 9,234,127 B2 | 1/2016 | De Paiva Cortes et al. |
| 9,284,953 B2 | 3/2016 | Blume |
| 9,435,454 B2 | 9/2016 | Blume |
| 9,879,659 B2 | 1/2018 | Kumar et al. |
| 10,520,037 B2 | 12/2019 | Kumar et al. |
| 2002/0020384 A1 | 2/2002 | Hoeg |
| 2003/0084556 A1 | 5/2003 | Dunlop |
| 2004/0170507 A1 | 9/2004 | Vicars |
| 2004/0234404 A1 | 11/2004 | Vicars |
| 2005/0081830 A1 | 4/2005 | Yu et al. |
| 2005/0247353 A1 | 11/2005 | Kao |
| 2006/0124176 A1 | 6/2006 | McIntire et al. |
| 2006/0131533 A1 | 6/2006 | Oh |
| 2006/0273277 A1 | 12/2006 | Heller et al. |
| 2007/0000544 A1 | 1/2007 | Thompson |
| 2007/0295411 A1 | 12/2007 | Schwegman |
| 2008/0279706 A1 | 11/2008 | Gambier et al. |
| 2009/0314979 A1 | 12/2009 | McIntire |
| 2010/0275445 A1 | 11/2010 | Weide |
| 2010/0325888 A1 | 12/2010 | Hawes |

(56) References Cited

U.S. PATENT DOCUMENTS

| | | | |
|---|---|---|---|
| 2011/0030213 | A1 | 2/2011 | Hawes et al. |
| 2011/0079302 | A1 | 4/2011 | Hawes |
| 2011/0126804 | A1 | 6/2011 | Lucas et al. |
| 2011/0173814 | A1 | 7/2011 | Patel |
| 2012/0141308 | A1 | 6/2012 | Saini et al. |
| 2013/0020521 | A1 | 1/2013 | Byrne |
| 2013/0202457 | A1 | 8/2013 | Bayyouk et al. |
| 2013/0202458 | A1 | 8/2013 | Byrne et al. |
| 2021/0148208 | A1 | 5/2021 | Thomas et al. |
| 2021/0148349 | A1 | 5/2021 | Nowell et al. |

FOREIGN PATENT DOCUMENTS

| | | |
|---|---|---|
| CA | 152313 | 12/1913 |
| CA | 2116461 A1 | 11/1994 |
| CA | 2214820 | 3/1999 |
| CN | 2690624 Y | 4/2005 |
| CN | 2861553 Y | 1/2007 |
| CN | 2898364 Y | 5/2007 |
| CN | ZL 200620034174.0 | 5/2007 |
| CN | 200984728 Y | 12/2007 |
| CN | 201225272 Y | 4/2009 |
| CN | 201284735 Y | 8/2009 |
| CN | 101688620 A | 3/2010 |
| CN | 201747329 | 2/2011 |
| CN | 201769174 | 3/2011 |
| CN | 201786639 U | 4/2011 |
| CN | 202001288 U | 10/2011 |
| CN | 202220728 U | 5/2012 |
| CN | 202326186 U | 7/2012 |
| CN | 103597262 A | 2/2014 |
| CN | ZL201330349899 | 2/2014 |
| CN | ZL2013303742673 | 3/2014 |
| DE | 69603178 T2 | 3/2000 |
| EP | 0 237 112 | 9/1987 |
| EP | 0 254 450 B1 | 1/1988 |
| EP | 0 512 594 | 11/1992 |
| GB | 0 855 956 A | 12/1960 |
| JP | 9217677 A | 8/1997 |
| JP | 2008546951 A | 12/2008 |
| JP | 2011017332 A | 1/2011 |
| KR | 181711 | 5/1999 |
| KR | 100402825 | 10/2003 |
| NL | 1020775 | 12/2003 |
| RU | 2073808 | 2/1997 |
| SU | 1576717 | 7/1990 |
| SU | 1751570 | 7/1992 |
| WO | WO-03/106842 | 12/2003 |
| WO | WO-2011/017689 | 2/2011 |
| WO | WO-2011/044332 A2 | 4/2011 |
| WO | WO-2011/060422 | 5/2011 |
| WO | WO-2012/142276 | 10/2012 |
| WO | WO-2013/116488 | 8/2013 |
| WO | WO 2013/116634 | 8/2013 |
| WO | WO-2015/077001 A1 | 5/2015 |

OTHER PUBLICATIONS

Final Office Action dated Jul. 5, 2013, by the USPTO, re U.S. Appl. No. 13/445,513.
International Preliminary Report on Patentability Ch II, dated Apr. 15, 2013, by the IPEA/US, re PCT/US2012/033307.
International Search Report and Written Opinion by the ISA/US, dated Apr. 9, 2013, re PCT/US2013/024096.
International Search Report and Written Opinion by the ISA/US, dated Apr. 9, 2013, re PCT/US2013/024325.
International Search Report and Written Opinion for Application No. PCT/US2010/044828 dated Mar. 29, 2011, 6 pages.
International Search Report and Written Opinion for Application No. PCT/US2010/051777 dated Jun. 21, 2011, 11 pages.
International Search Report and Written Opinion for Application No. PCT/US2010/056846 dated Jun. 23, 2011, 6 pages.
International Search Report and Written Opinion for Application No. PCT/US2012/033307 dated Jul. 5, 2012, 10 pages.
International Search Report dated Feb. 23, 2015 in corresponding PCT Application No. PCT/US2014/067686, 3 pages.
Notice of Allowance dated Dec. 5, 2013, by the USPTO, re U.S. Appl. No. 29/444,103.
Office Action dated Apr. 29, 2013, by the USPTO, re U.S. Appl. No. 12/852,376.
Office Action dated Jul. 14, 2014, by the USPTO, re U.S. Appl. No. 13/756,715.
Office Action dated Jul. 16, 2014, by the USPTO, re U.S. Appl. No. 13/755,217.
Office Action dated Mar. 25, 2013, by the USPTO, re U.S. Appl. No. 13/445,513.
Office Action dated Mar. 26, 2013, by the USPTO, re U.S. Appl. No. 12/947,498.
Office Action dated May 8, 2012, by the USPTO, re U.S. Appl. No. 12/900,146.
Restriction Requirement dated Jan. 8, 2013, by the USPTO, re U.S. Appl. No. 12/947,498.
SPM Drawing #3L108223, Seat Puller Assay Listing TWS400-QWS, mailed on Aug. 2, 2002.
SPM Drawing #P108217, Seat Puller Head Assembly 1.25, mailed on Sep. 22, 2008.
SPM Drawing #P23579, Seat Puller/Head Assy. 4.50"-5.00" TWS900, QWS mailed on Aug. 4, 2008.
SPM Engineering Bulletin 1010, Valve Seat Puller Jaws All Sizes of Valve Seats 2S-7S—Original Style—New Style Featuring Initial Standoff—mailed on Jan. 1997.
Written Opinion dated Feb. 23, 2015 in corresponding PCT Application No. PCT/US2014/067686, 9 pages.
IPR 2022-00365 Petition, 106 pages, Dec. 23, 2021.
IPR 2022-00365, Exhibit 1002 Declaration of Steven Tipton, Dec. 23, 2021.
IPR 2022-00365, Exhibit 1018, Tackett, et al, Positive Displacement Reciprocating Pump Fundamentals—Power & Direct Acting Types; Proceedings of the Twenty-Fourth International Pump Users Symposium 2008, pp. 45-58.
IPR 2022-00365, Exhibit 1026, Weir SPM Catalog, Well Service Pumps, 40 pages (2009).
IPR 2022-00365, Exhibit 1032, www.matweb.com/index.aspx, 6 pages, accessed Dec. 18, 2021.
IPR 2022-00365, Exhibit 1038, Gopal S. Upadhyaya, Noyes Publications: Cemented Tungsten Carbides: Production, Properties, and Testing, 42 pages (1998).
IPR 2022-00365, Exhibit 1039, Melville, Fracking_An Industry Under Pressure, 7 pages (2013).
Mott, IPR 2022-00365, Exhibit 1042, Machine Elements in Mechanical Design, Pearson Prentice Hall, 4th Ed. (2004).
IPR 2022-00365, Exhibit 1044, Gardner Denver, Pump University: Frac & Well Service Pump Valves & Seats, 2 pages.
IPR 2022-00365, Exhibit 1045, Oxford Dictionary of Mechanical Engineering, 1 Ed., "limits and fits", 4 pages (2021).
IPR 2022-00365, Exhibit 1045, Declaration of James Hall, in IPR 2022-00365, Dec. 23, 2021.
IPR 2022-00365, Patent Owner's Preliminary Response, 77 pages, Apr. 21, 2022.
IPR 2022-00365, Exhibit 2001, Declaration of Timothy Morse in IPR 2022-00365, Apr. 1, 2022.
IPR 2022-00365, Exhibit 2006, Kerr's Preliminary Invalidity Contentions, Kerr v. SPM, 4:21-cv-1191-O, 119 pages, Apr. 18, 2022.
IPR 2022-00365, Exhibit 2009, Gidley et al., Ed., Recent Advances in Hydraulic Fracturing, Society of Petroleum Engineers, Part 1, pp. 1-215 (1989).
IPR 2022-00365, Exhibit 2009, Gidley et al., Ed., Recent Advances in Hydraulic Fracturing, Society of Petroleum Engineers, Part 2, pp. 216-452 (1989).
IPR 2022-00365, Exhibit 2010 US/DOE, Modern Shale Gas Development in the US: A Primer, 116 pages (2009).
IPR 2022-00365, Exhibit 2011, Economides et al, Reservoir Stimulation, John Wiley & Sons Ltd., Ed., Third Ed., 824 pages (2000).

(56) References Cited

OTHER PUBLICATIONS

IPR 2022-00365, Exhibit 2012, Langenkamp, Handbook of Oil Industry Terms & Phrases, PennWell Books, Fourth Ed., 11 pages (1974).
IPR 2022-00365, Exhibit 2013, Lake, Ed., Petroleum Engineering Handbook; vol. II: Drilling Engineering, Mitchell, Ed., Society of Petroleum Engineers, 600 pages, Part 1 (2006).
IPR 2022-00365, Exhibit 2013, Lake, Ed., Petroleum Engineering Handbook; vol. II: Drilling Engineering, Mitchell, Ed., Society of Petroleum Engineers, 172 pages, Part 2 (2006).
IPR 2022-00365, Exhibit 2014, Pump Handbook, Karassik et al, ed McGraw Hill, Third Ed., 1789 pages (2001).
IPR 2022-00365, Petitioner's Preliminary Reply Regarding Fintiv Analysis, 13 pages, May 12, 2022.
IPR 2022-00365, Exhibit 1051, Defendant's Disclosure of Asserted Claims and Infringement Contentions, *Kerr v. SPM*, 4:21-cv-1191-O, 199 pages, Mar. 8, 2022.
IPR 2022-00365, Patent Owner's Preliminary Sur-Reply, 14 pages, May 23, 2022.
IPR 2022-00365, Exhibit 2017, Kerr's Preliminary Claim Constructions and Identification of Extrinsic Evidence, 5 pages, May 6, 2022.
IPR 2022-00365, Institution Decision, 36 pages Jul. 14, 2022.
Doc 53 SPM's Opening Claim Construction Brief filed by *S.P.M Flow Control, Inc., Kerr Machine Co. v. SPM Oil & Gas Inc. et al*, 4_21-cv-1191 Jul. 13, 2022.
Doc 54 Appendix to Doc 53 in Support SPM's Opening Claim Construction Brief, *Kerr Machine Co. v. SPM Oil & Gas Inc. et al*, 4:21-cv-1191 Jul. 14, 2022.
Doc 55 Plaintiff Kerr Machine Co. Opening Claim Construction Brief, *Kerr Machine Co. v. SPM Oil & Gas Inc. et al*, 4:21-cv-1191 Jul. 14, 2022.
Doc 56 Appendix to Doc 55 Brief and Memorandum in Support of Motion, *Kerr Machine Co. v. SPM Oil & Gas Inc. et al*, 4:21-cv-1191 Jul. 14, 2022.
Doc No. 68, SPM's Responsive Claim Construction Brief, *SPM Oil & Gas Inc., Kerr v. SPM*, 4:21-cv-1191-O, 119 pages, Apr. 18, 2022.
Doc No. 69, *Kerr Machine Co. v. SPM Oil & Gas Inc et al.*, Appendix in Support of Doc 68 filed by S.P.M Flow Control, Inc., 22 pages Aug. 12, 2022.
Doc No. 70, *Kerr Machine Co. v. SPM Oil & Gas Inc et al.*, Plaintiff Kerr Machine Co.'s Responsive Claim Construction Brief, 21 pages Aug. 12, 2022.
Doc No. 70-1, *Kerr Machine Co. v. SPM Oil & Gas Inc et al.*, Appendix to Doc 70, Plaintiff Kerr Machine Co.'s Responsive Claim Construction Brief, 881 pages, Aug. 12, 2022.
Doc No. 72 Notice of Filing and Joint Claim Construction Chart, *Kerr Machine Co. v. SPM Oil & Gas Inc. et al*, 4:21-cv-1191 Aug. 19, 2022.
Docket Report, *Kerr v. SPM*, 4:21-cv-1191, 10 pages, Aug. 25, 2022.

* cited by examiner

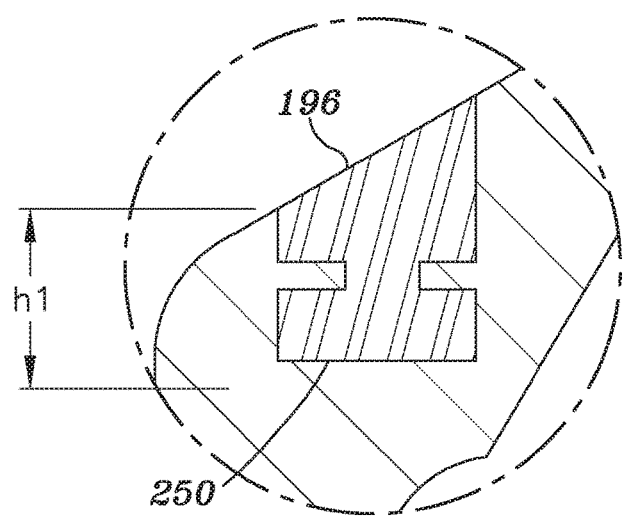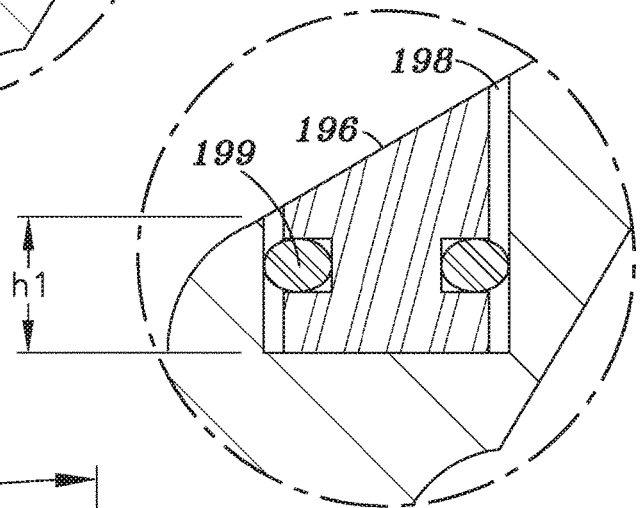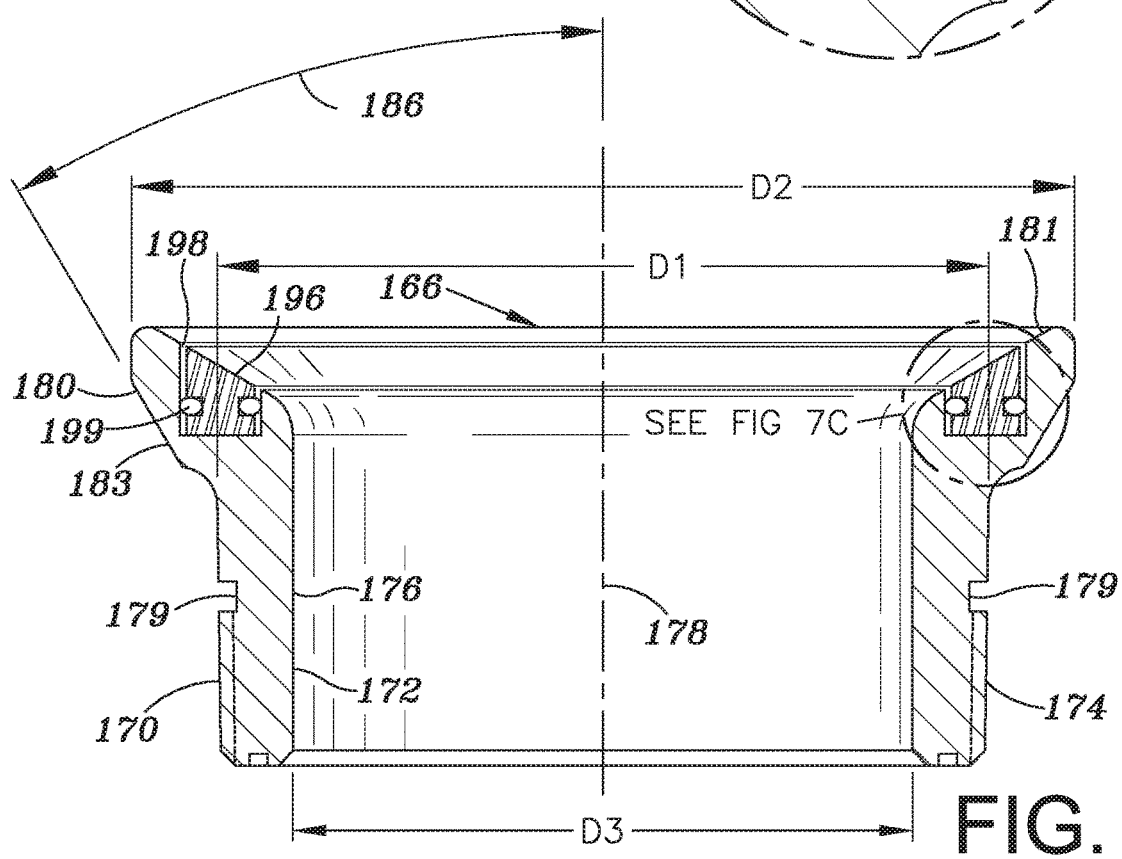

VALVE SEATS FOR USE IN FRACTURING PUMPS

CROSS-REFERENCE TO RELATED APPLICATION

This application is a continuation of U.S. patent application Ser. No. 16/026,732, filed on Jul. 3, 2018, which is a continuation of U.S. patent application Ser. No. 15/814,501, filed on Nov. 16, 2017, currently pending, which is a divisional application of U.S. patent Ser. No. 14/555,020, filed on Nov. 26, 2014, now U.S. Pat. No. 9,822,894, which claims priority to and the benefit of U.S. Provisional Patent Application Ser. No. 61/909,197, filed on Nov. 26, 2013, each of which are incorporated herein by reference in their entireties.

TECHNICAL FIELD

This disclosure relates to reciprocating pumps, and, in particular, to valve seats used in reciprocating pumps.

BACKGROUND OF THE DISCLOSURE

In oilfield operations, reciprocating pumps are used for different applications such as fracturing the subterranean formation, cementing the wellbore, or treating the wellbore and/or formation. A reciprocating pump typically includes a power end and a fluid end or cylindrical section. The fluid end is typically formed of a one piece construction or a series of blocks secured together by rods. The fluid end includes an opening for receiving a plunger or plunger throw, an inlet passage, an outlet passage, and an access port. Reciprocating pumps are oftentimes operated at pressures of 10,000 pounds per square inch (psi) and upward to 25,000 psi and at rates of up to 1,000 strokes per minute or even higher during fracturing operations. A reciprocating pump designed for fracturing operations is referred to as a frac pump.

During operation of a frac pump, a fluid is pumped into the fluid end through the inlet passage and out of the pump through the outlet passage. The inlet and outlet passages each include a valve assembly, which is a check type of valve that is opened by differential pressure of the fluid and allows the fluid to flow in only one direction. This fluid often contains solid particulates or corrosive material that can cause corrosion, erosion and/or pitting on surfaces of the valve assembly. One particular area of erosion and pitting generally occurs on interacting surfaces of the valve assembly, which consists of a valve seat fixed into the inlet or outlet passages within the fluid end and a valve body that moves cyclically relative to the valve seat. In operation, the valve is operable between an open position, in which the valve body is spaced apart from the valve seat to facilitate fluid flow through the valve, and a closed position, in which the valve body contacts and sealingly engages the valve seat.

During operation, solid particulates are oftentimes trapped between the interacting surfaces of the valve body and the valve seat, causing erosion and pitting of these surfaces. Because the valve seat is securely fastened within the fluid end, it is more difficult and cumbersome to replace the valve seat than the valve body. For example, a valve seat is oftentimes fixed inside the fluid passageway by way of an interference fit; thus, removing the valve seat from the fluid passageway oftentimes increases the risk of damage to the pump fluid end. There is a need to provide a valve having an increased resistance to wear to address one or more of the foregoing issues, among others.

SUMMARY

In a first aspect, a valve seat at least partially formed of a ceramic material for use in a fracturing pump includes a first body and a second body. The first body has an outer diameter D1 and is configured to be inserted into a fluid passageway of the fracturing pump. The second body extends radially from the first body and has an outer diameter, D2, greater than the outer diameter, D1. The second body at least partially formed of the ceramic material.

In certain embodiments, the second body is a tapered shoulder.

In other embodiments, the second body is a tapered shoulder extending radially from the first body at an angle between five and seventy-five degrees.

In yet another embodiment, the valve seat is configured to sealingly receive a valve body.

In still another embodiment, the valve seat is formed from the ceramic material.

In certain embodiments, only the second body is formed from the ceramic material.

In other embodiments, at least a portion of the second body has an outer coating formed from the ceramic material.

In yet another embodiment, at least a portion of the second body has an outer coating formed from the ceramic material and wherein the outer coating is formed by spraying or dipping the at least the portion of the second body with the ceramic material.

In still another embodiment, at least a portion of the second body has an outer coating formed from the ceramic material and wherein the outer coating has a thickness, t1, between approximately $\frac{1}{32}$ inches and $\frac{1}{2}$ inches.

In certain embodiments, the second body includes an insert comprising the ceramic material.

In other embodiments, the second body includes an insert comprising the ceramic material, wherein the insert is fixed to the second body by bonding, press-fit, shrink-fit, sintering, or combination thereof.

In yet another embodiment, the second body includes an insert comprising the ceramic material, wherein the insert has a height, ht, between approximately $\frac{1}{32}$ inches to $\frac{1}{2}$ inches.

In still another embodiment, the second body includes an insert comprising the ceramic material, and wherein the second body is configured such that the insert is positioned to contact at least a portion of a valve body to create a seal between the insert and the portion of the valve body.

In certain embodiments, the second body includes an insert comprising the ceramic material, and wherein the second body is configured such that the insert is positioned to contact at least a portion of a valve body to create a seal between the insert and the portion of the valve body.

In other embodiments, the second body includes an insert comprising the ceramic material, and wherein the second body is configured such that the insert is positioned to contact at least a portion of a valve body to create a seal between the insert and the portion of the valve body, and wherein the ceramic material has a material hardness value, H1 greater than a material hardness value, H2, of the valve body.

In yet another embodiment, the second body includes an insert comprising the ceramic material, and wherein the second body is configured such that the insert is positioned to contact at least a portion of a valve body to create a seal between the insert and the portion of the valve body, and wherein the insert is fixed to the second body by bonding, press-fit, shrink-fit, sintering, or combination thereof.

In still another embodiment, the second body includes an insert comprising the ceramic material, and wherein the second body is configured such that the insert is positioned to contact at least a portion of a valve body to create a seal between the insert and the portion of the valve body, and wherein the insert has a height, ht, between approximately $1/32$ inches to $1/2$ inches.

In certain embodiments, the ceramic material comprises zirconia, tungsten carbide nickel, or tungsten carbide cobalt.

In a second aspect, a valve seat for use in a fracturing pump includes a cylindrical body and a tapered shoulder. The cylindrical body has an inner surface and an opposing, outer surface, with the inner surface forming a bore along a longitudinal axis of the cylindrical body. The outer surface is configured to be fitted against a first wall of the fracturing pump, wherein the first wall forms a first fluid passageway. The tapered shoulder extends radially from the cylindrical body and has an inner surface and an opposing, outer surface. At least a portion of the inner surface is formed from a ceramic material. The outer surface is configured to be fitted against a second wall of the fracturing pump. The second wall forms a second fluid passageway that has a larger diameter than the first fluid passageway.

In certain embodiments, the ceramic material comprises zirconia, tungsten carbide nickel, or tungsten carbide cobalt.

In a third aspect, a valve assembly for use in a fracturing pump includes a valve body and a valve seat. The valve body is moveable between an open position and a closed position, the valve body includes a head portion and a tail portion. The valve seat is at least partially formed of a ceramic material and includes a first body and a second body. The first body has an outer diameter, D1, and an inner diameter, D3, and is configured to receive the tail portion of the valve body. The second body is at least partially formed of a ceramic material and extends radially from the first body. The second body has an outer diameter, D2, that is greater than the outer diameter, D1, of the first body. The second body is configured to sealingly engage the head portion of the valve body.

In certain embodiments, a seal body is partially positioned within a groove formed in the head portion of the valve body such that the seal body is configured to create a seal between the head portion of the valve body and the second body of the valve seat when the valve body is in the closed position.

In other embodiments, a seal body is partially positioned within a groove formed in the head portion of the valve body such that the seal body is configured to create a seal between the head portion of the valve body and the second body of the valve seat when the valve body is in the closed position, and wherein the seal body is formed of an elastomeric material.

In yet another embodiment, the second body is a tapered shoulder.

In still another embodiment, the second body is a tapered shoulder extending radially from the first body at an angle between five and seventy-five degrees.

In certain embodiments, the entire valve seat is formed from the ceramic material.

In other embodiments, a portion of the valve body is formed from the ceramic material.

In yet another embodiment, at least a portion of the second body has an outer coating formed from the ceramic material.

In still another embodiment, at least a portion of the second body has an outer coating formed from the ceramic material, wherein the outer coating is formed by spraying or dipping the at least the portion of the second body with the ceramic material.

In certain embodiments, at least a portion of the second body has an outer coating formed from the ceramic material, wherein the outer coating has a thickness, t1, between approximately $1/32$ inches and $1/2$ inches.

In other embodiments, at least a portion of the second body has an outer coating formed from the ceramic material, wherein the outer coating has a thickness, t1, between approximately $1/32$ inches and $1/2$ inches.

In yet another embodiment, the second body includes an insert comprising the ceramic material.

In still another embodiment, the second body includes an insert comprising the ceramic material, wherein the insert is fixed to the second body by bonding, press-fit, shrink-fit, sintering, or combination thereof.

In certain embodiments, the second body includes an insert comprising the ceramic material, wherein the insert has a height, ht, between approximately $1/32$ inches to $1/2$ inches.

In certain embodiments, the second body includes an insert comprising the ceramic material, and wherein the second body is configured such that the insert is positioned to contact at least a portion of the head portion of the valve body.

In other embodiments, the second body includes an insert comprising the ceramic material, and wherein the second body is configured such that the insert is positioned to contact at least a portion of the head portion of the valve body, wherein the ceramic material has a material hardness value, H1 greater than a material hardness value, H2, of the valve body.

In yet another embodiment, the second body includes an insert comprising the ceramic material, and wherein the second body is configured such that the insert is positioned to contact at least a portion of the head portion of the valve body, wherein the insert is fixed to the second body by bonding, press-fit, shrink-fit, sintering, or combination thereof.

In still another embodiment, the second body includes an insert comprising the ceramic material, and wherein the second body is configured such that the insert is positioned to contact at least a portion of the head portion of the valve body, wherein the insert has a height, ht, between approximately $1/32$ inches to $1/2$ inches.

In certain embodiments, the ceramic material comprises zirconia, tungsten carbide nickel, or tungsten carbide cobalt.

In a fourth aspect, a valve assembly includes a valve body moveable between an open position and a closed position, a valve seat, and a seal body. The valve seat is at least partially made from a ceramic material and has an inner surface that forms a bore along a longitudinal axis of the valve seat for receiving at least a portion of the valve body and a tapered surface extending outwardly from the inner surface. The seal body is configured to contact an outer portion of the tapered surface when the valve body is in the closed position to create a seal between the outer portion and the valve body.

In certain embodiments, a gap is formed between an inner portion of the tapered surface and the valve body when the valve body is in the closed position.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

FIG. 6C is an enlarged view of a portion of the valve seat of FIG. 6.

FIG. 7 is a cross-sectional view of a valve seat according to another exemplary embodiment.

FIG. 7C is an enlarged view of a portion of the valve seat of FIG. 7.

DETAILED DESCRIPTION

Figure 1:
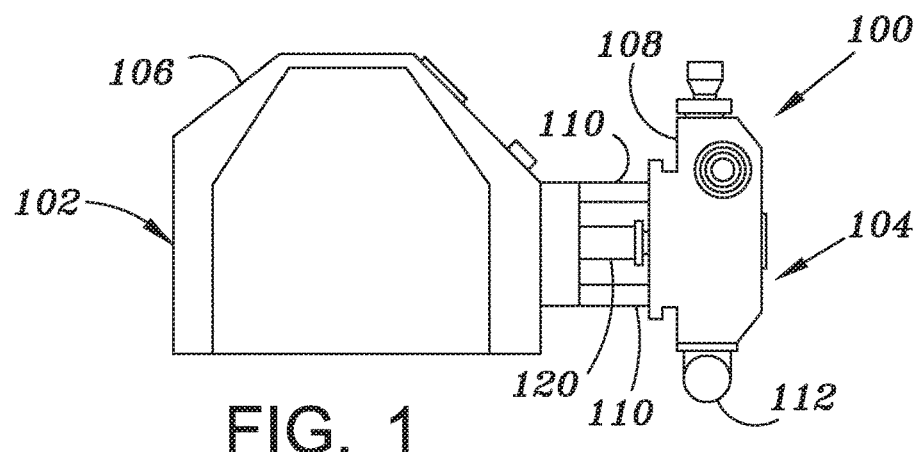
FIG. 1 is an elevational view of a reciprocating pump assembly according to an exemplary embodiment, the reciprocating pump assembly includes a fluid cylinder assembly.
Figure 2:
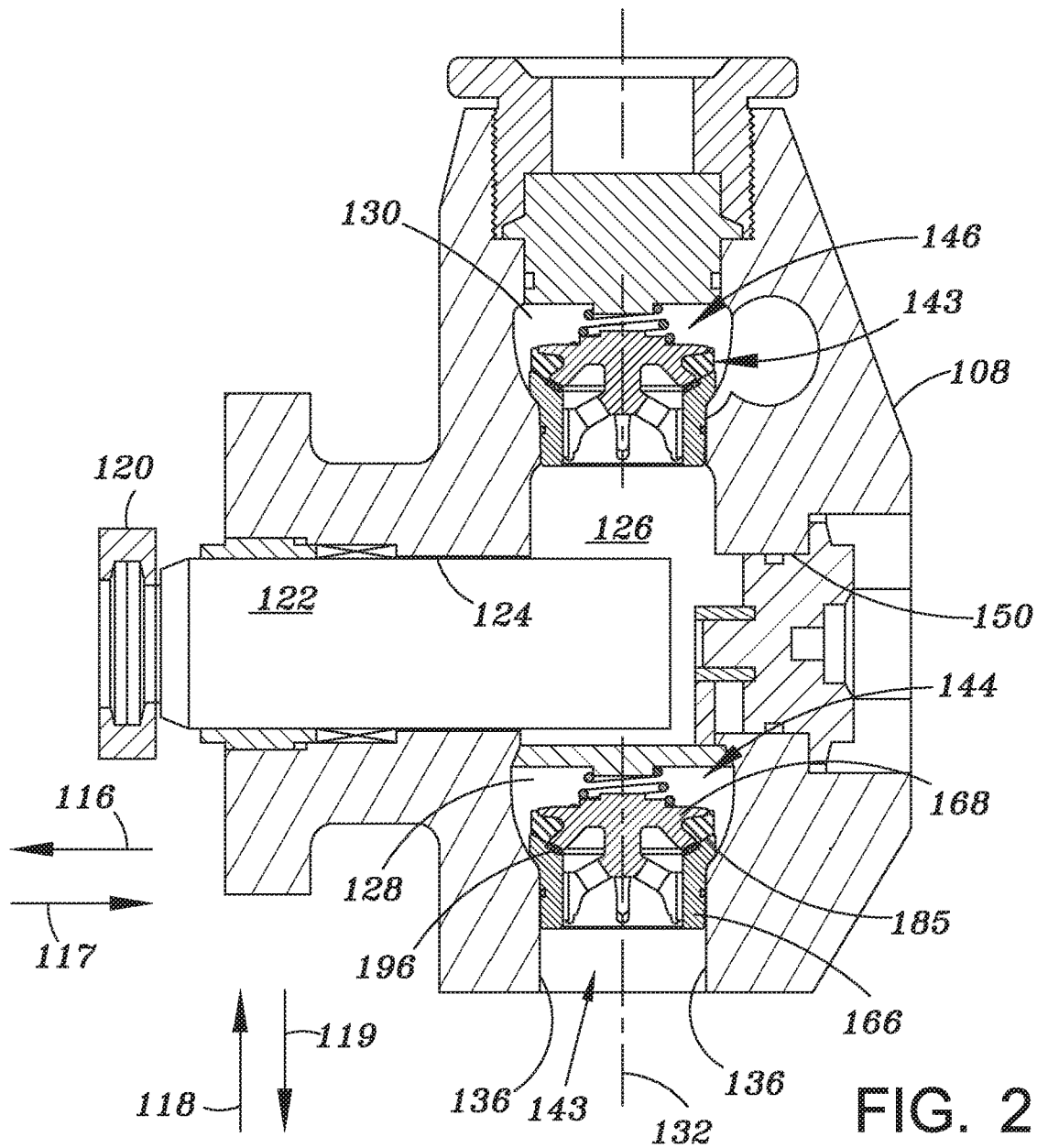
FIG. 2 is a cross-sectional view of the fluid cylinder assembly of FIG. 1 according to an exemplary embodiment, the fluid cylinder assembly includes a fluid cylinder having inlet and outlet valve assemblies, each of the valve assemblies including a valve seat.
Figure 3:
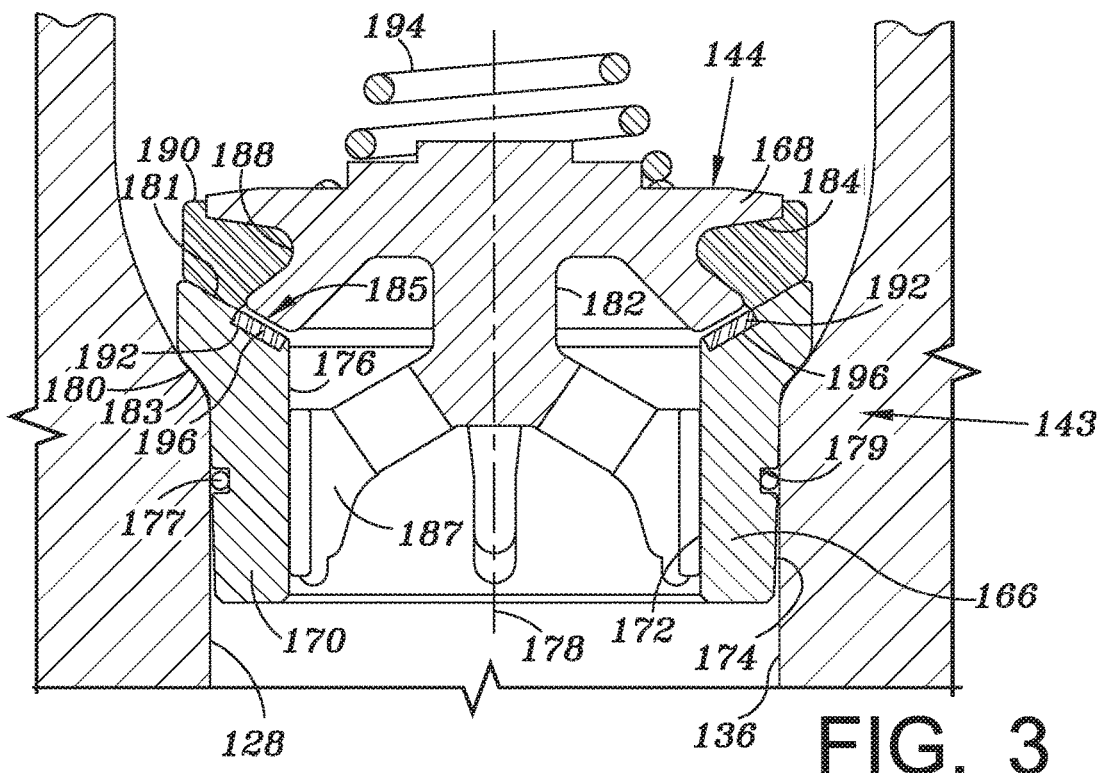
FIG. 3 is an enlarged view of the inlet valve assembly illustrated in FIG. 2, according to an exemplary embodiment.

Referring to FIGS. 1-3, an illustrative embodiment of a reciprocating pump assembly 100 is presented in which an insert 196 (FIG. 3) is employed to reduce damage to, and thus, extend the operating life of, a valve assembly 143, due to corrosion, erosion, pitting or the like. In the embodiment illustrated in FIGS. 1-3, the insert 196 is formed of a high strength ceramic material; however, it should be understood that insert 196 may be otherwise formed. In FIGS. 1-3, the reciprocating pump assembly 100 includes a power end portion 102 and a fluid end portion 104 operably coupled thereto. The power end portion 102 includes a housing 106 in which a crankshaft (not shown) is disposed, the crankshaft is driven by an engine or motor (not shown). The fluid end portion 104 includes a fluid end block or fluid cylinder 108, which is connected to the housing 106 via a plurality of stay rods 110. In operation and as discussed in further detail below, the crankshaft reciprocates a plunger rod assembly 120 between the power end portion 102 and the fluid end portion 104. According to some embodiments, the reciprocating pump assembly 100 is freestanding on the ground, is mounted to a trailer for towing between operational sites, or is mounted to a skid.

Referring to FIGS. 1 and 2, the plunger rod assembly 120 includes a plunger 122 extending through a bore 124 and into a pressure chamber 126 formed in the fluid cylinder 108. At least the bore 124, the pressure chamber 126, and the plunger 122 together may be characterized as a plunger throw. According to some embodiments, the reciprocating pump assembly 100 includes three plunger throws (i.e., a triplex pump assembly); however, in other embodiments, the reciprocating pump assembly includes a greater or fewer number of plunger throws.

In the embodiment illustrated in FIG. 2, the fluid cylinder 108 includes fluid inlet and outlet passages 128 and 130 formed therein, which are generally coaxially disposed along a fluid passage axis 132. As described in greater detail below, fluid is adapted to flow through the fluid inlet and outlet passages 128 and 130 and along the fluid passage axis 132.

In the embodiment illustrated in FIG. 2, an inlet valve assembly 144 is disposed in the fluid inlet passage 128 and an outlet valve assembly 146 is disposed in the fluid outlet passage 130. In FIG. 2, the valve assemblies 144 and 146 are spring-loaded, which, as described in greater detail below, are actuated by at least a predetermined differential pressure across each of the valve assemblies 144 and 146.

Figure 4:
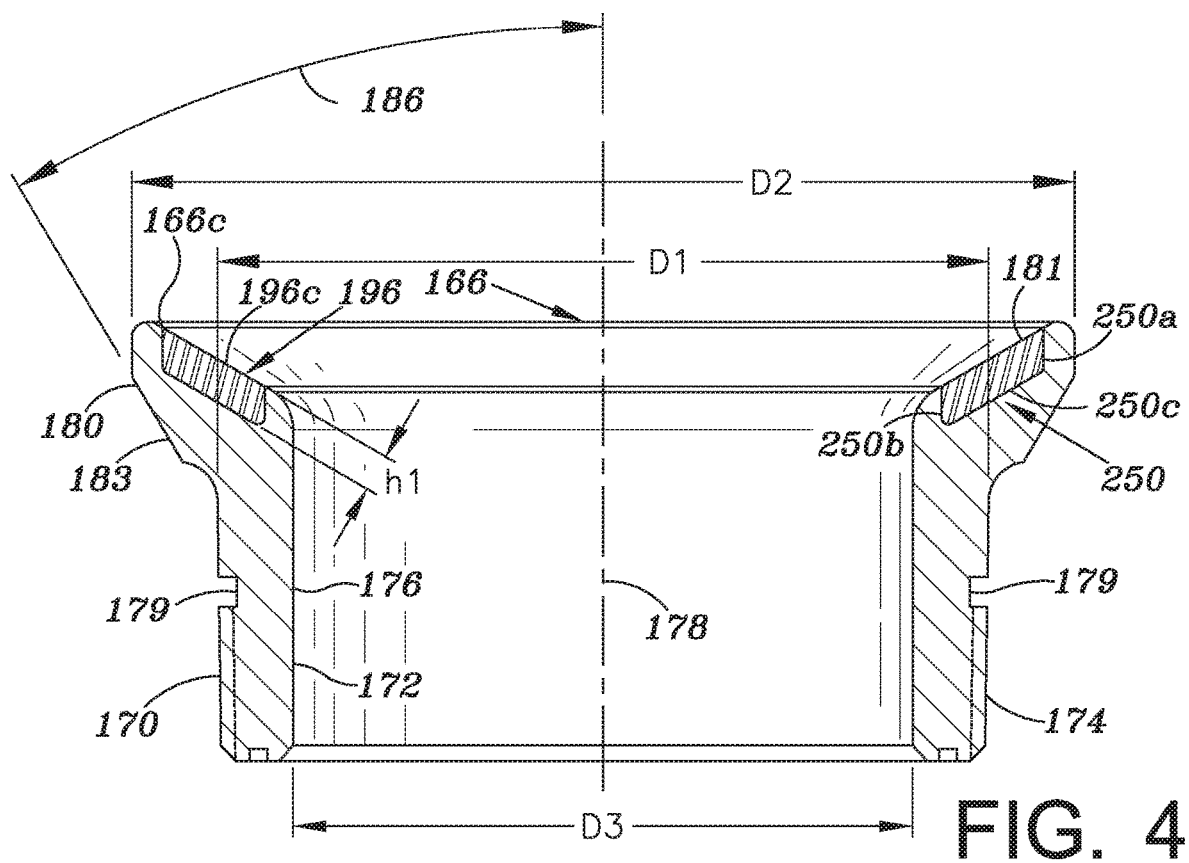
FIG. 4 is a cross-sectional view of a valve seat according to an exemplary embodiment.

Referring to FIG. 3, the inlet valve assembly 144 includes a valve seat 166 and a valve body 168 engaged therewith. The valve seat 166 includes a first or cylindrical body 170 having an inner surface 172 and an opposing outer surface 174. The inner surface 172 forms a bore 176 along a valve seat axis 178 of the valve seat 166, which is coaxial with the fluid passage axis 132 when the inlet valve assembly 144 is disposed in the fluid inlet passage 128. The outer surface 174 of the cylindrical body 170 contacts an inside surface 136 of the fluid cylinder 108, sealing element 177, such as an o-ring, is disposed in an annular groove 179 formed in the outer surface 174 of the cylindrical body 170 to sealingly engage the inside surface 136 of the fluid inlet passage 128. According to some embodiments, the cylindrical body 170 forms an interference fit or is press fit against the inside surface 136 so that the valve seat 166 is securely fastened within the fluid inlet passage 128. The cylindrical body 170 has an outer diameter, D1, and an inner diameter, D3, as best illustrated in FIG. 4. According to certain embodiments, at least a portion of the valve seat 166 or valve body 168 is formed from stainless steel.

Referring to FIGS. 3 and 4, the valve seat 166 further includes a second body 180 having a tapered shoulder that extends radially from the first body 170. The second body 180 has an inner surface 181 and an opposing, outer surface 183. The outer surface 183 contacts and otherwise abuts against the inside surface 136 of the fluid inlet passage 128 (FIG. 3). In an exemplary embodiment, the tapered shoulder 180 extends at an angle 186 from the valve seat axis 178, which angle ranges from about 5 degrees to about 90 degrees. The second body 180 has an outer diameter, D2, greater than the outer diameter, D1, of the first body 170.

According to certain embodiments, insert 196 is formed from a ceramic material. In an exemplary, non-limiting embodiment, the ceramic material may be zirconia, partially stabilized zirconia, a tungsten carbide such as tungsten carbide nickel, or tungsten carbide cobalt, titanium carbide, silicon nitride, or sialon. The hardness of the ceramic material may range from about 12 to 22 GPa with reference to the Vickers hardness number. In certain embodiments, the entire valve seat 166 and the valve body 168 may be formed from ceramic material or only a portion of one or both of the valve seat 166 and the valve body 168 may be formed from the ceramic material. In certain embodiments, the insert 196 is fixed to the valve seat 166 or the valve body 168 by a press-fit, shrink-fit, bonding, sintering, welding or combinations thereof. In other embodiments, the ceramic material is a coating applied by dipping or spraying. The portions formed from ceramic are generally harder than the surrounding materials. In operation, the insert 196 is used to extend the life span of the valve assembly 143, which is subject to corrosion, erosion, or pitting during operation.

Referring to FIGS. 1-3, the valve body 168 includes a tail portion 182, from which a head portion 184 extends radially outward. An annular cavity 188 is formed in the head portion 184 to receive a seal 190 to sealingly engage at least a portion of the inner surface 181 of the valve seat 166. In the embodiment illustrated in FIG. 3, for example, the head portion 184 further includes a distal end 185 configured to sealingly engage at least a portion of the inner surface 181. According to some embodiments, the distal end 185 has a material hardness less than the material hardness of the inner surface 181. In an alternative embodiment, the distal end 185 has a material hardness substantially equal to the inner surface 181. In this configuration, the valve body 168 typically wears faster, and thus, needs to be replaced before the valve seat 166. One skilled in the art will appreciate that the valve body 168 is generally easier, and thus cheaper, to replace than the valve seat 166.

With continued referenced to FIG. 3, the ail portion 182 includes a plurality of circumferentially-spaced legs 187 angularly extending from the head portion 184 to slidably engage the inside surface 172 of the cylindrical body 170. In FIG. 3, the head portion 184 is engaged and otherwise biased by a spring 194, which, as discussed in greater detail below, biases the valve body 170 to a closed position, to prevent fluid flow.

In the embodiment illustrated in FIG. 3, for example, the seal 190 is molded in place in the head portion 184. In other embodiments, the seal 190 is preformed and then attached to the head portion 184. According to some embodiments, the seal 190 is composed of one or more materials such as, for example, a deformable thermoplastic material, a urethane material, a fiber-reinforced material, carbon, glass, cotton, wire fibers, cloth, and/or any combination thereof. In other embodiments, the seal 190 is composed of a cloth, which is disposed in a thermoplastic material. According to some embodiments, the cloth includes carbon, glass, wire, cotton fibers, and/or any combination thereof. In yet other embodiments, the seal 190 is composed of at least a fiber-reinforced material, which can prevent or at least reduce delamination. According to embodiments disclosed herein, the seal 190 has a hardness of 95 A durometer or greater, or a hardness of 69 D durometer or greater based on the Rockwall Hardness scale. In several exemplary embodiments, the head portion 184 is harder and more rigid than the seal 190.

In the embodiment illustrated in FIG. 2, the outlet valve assembly 146 is be identical to the inlet valve assembly 144 and therefore will not be described in further detail.

With reference to FIGS. 1-3, operation of the reciprocating pump assembly 100 is discussed. In operation, the plunger 122 reciprocates within the bore 124 for movement in and out of the pressure chamber 126. That is, the plunger 122 moves back and forth horizontally, as viewed in FIG. 2, away from and towards the fluid passage axis 132 in response to rotation of the crankshaft (not shown) that is enclosed within the housing 106. As the plunger 122 moves in the direction of arrow 116 out of the pressure chamber 126, the inlet valve 144 is opened. More particularly, as the plunger 122 moves away from the fluid passage axis 132 in the direction of arrow 116, the pressure inside the pressure chamber 126 decreases, creating a differential pressure across the inlet valve 144 and causing the valve body 168 to move upward in the direction of arrow 118, as viewed in FIGS. 2 and 3, relative to the valve seat 166. As a result of the upward movement of the valve member 168, the spring 194 is compressed and the seal 190 separates from the inner surface 181 of the tapered shoulder 180 to the open position. Fluid entering through the fluid inlet passage 112 (FIG. 1) flows along the axis 132 and through the inlet valve 144, being drawn into the pressure chamber 126. To flow through the inlet valve 144, the fluid containing particulates flows through the bore 176 of the valve seat 166 and along the valve seat axis 178. During the fluid flow through the inlet valve 144 and into the pressure chamber 126, the outlet valve 146 is in its closed position, with the seal 190 of the valve body 168 of the outlet valve 146 engaging the inner surface 181 of the tapered shoulder 180. Fluid continues to be drawn into the pressure chamber 126 until the plunger 122 is at the end of its stroke farthest away from the fluid passage axis 132. At this point, the differential pressure across the inlet valve 144 is such that the spring 194 of the inlet valve 144 begins to decompress and extend, forcing the valve member 168 of the inlet valve 144 to move downward in the direction of arrow 119, as viewed in FIGS. 2 and 3. As a result, the inlet valve 144 moves to and is otherwise placed in the closed position, with the seal 190 and the distal end 185 sealingly engaging the inner surface 181.

As the plunger 122 moves in the direction of arrow 117 into the pressure chamber 126, the pressure within the pressure chamber 126 increases. The pressure increases until the differential pressure across the outlet valve 146 exceeds a predetermined set point, at which point the outlet valve 146 opens and permits fluid to flow out of the pressure chamber 126, along the fluid passage axis 132 through the outlet valve. As the plunger 122 reaches the end of its stroke towards the fluid passage axis 132 (i.e., its discharge stroke), the inlet valve 144 is positioned in the closed position, with the seal 190 and the distal end 185 sealingly engaging the inner surface 181. Because particulates from the fluid oftentimes become trapped between the contacting surfaces of the valve body 168 and the valve seat 170, the ceramic insert 196 reduces and/or otherwise prevents the wear of the valve body 168 and/or the valve seat 166. For illustrative purposes, the ceramic insert 196 is only shown as being positioned in the valve seat 166; however, it should be appreciated that the ceramic insert 196 may be positioned in both the valve body 168 and the valve seat 166 to prevent wear.

Referring now to FIGS. 3-9, multiple exemplary embodiments of the ceramic insert 196 are illustrated. As previously mentioned, the entire valve seat 166 or the entire valve body 168 may be formed from ceramic material. Alternatively, only a portion 192 of the valve seat 166 or the valve body 168 may be formed of ceramic, which, for illustrative purposes, is referred to herein as the ceramic insert 196. In an exemplary embodiment, the ceramic material may be zirconia, partially stabilized zirconia, a tungsten carbide such as tungsten carbide nickel, or tungsten carbide cobalt, titanium carbide, silicon nitride, or sialon. In certain embodiments, the ceramic material may be a refractory material such as oxides of aluminum, silicon, and/or magnesium. In use, the ceramic insert 196 extends the life span of the valve seat 166 or valve body 168 in areas that are subject fail from many factors such as, but not limited to, corrosion, erosion, and/or pitting.

According to some embodiments, the hardness, H1, of the ceramic material ranges from about 12 to 22 GPa with reference to the Vickers hardness number, and the hardness the ceramic insert 196 being harder than other surrounding areas. For example, the valve seat 166 includes the ceramic insert 196 having the hardness, H1, that is greater than a hardness, H2, of the adjacent valve seat 166 material or of the contact surface of the valve body 168, which may include the seal 190 and the end portion 185. In one embodiment, the valve seat 166 and the valve body 168 are formed from stainless steel with the ceramic insert 196 formed from a ceramic.

Figure 8:
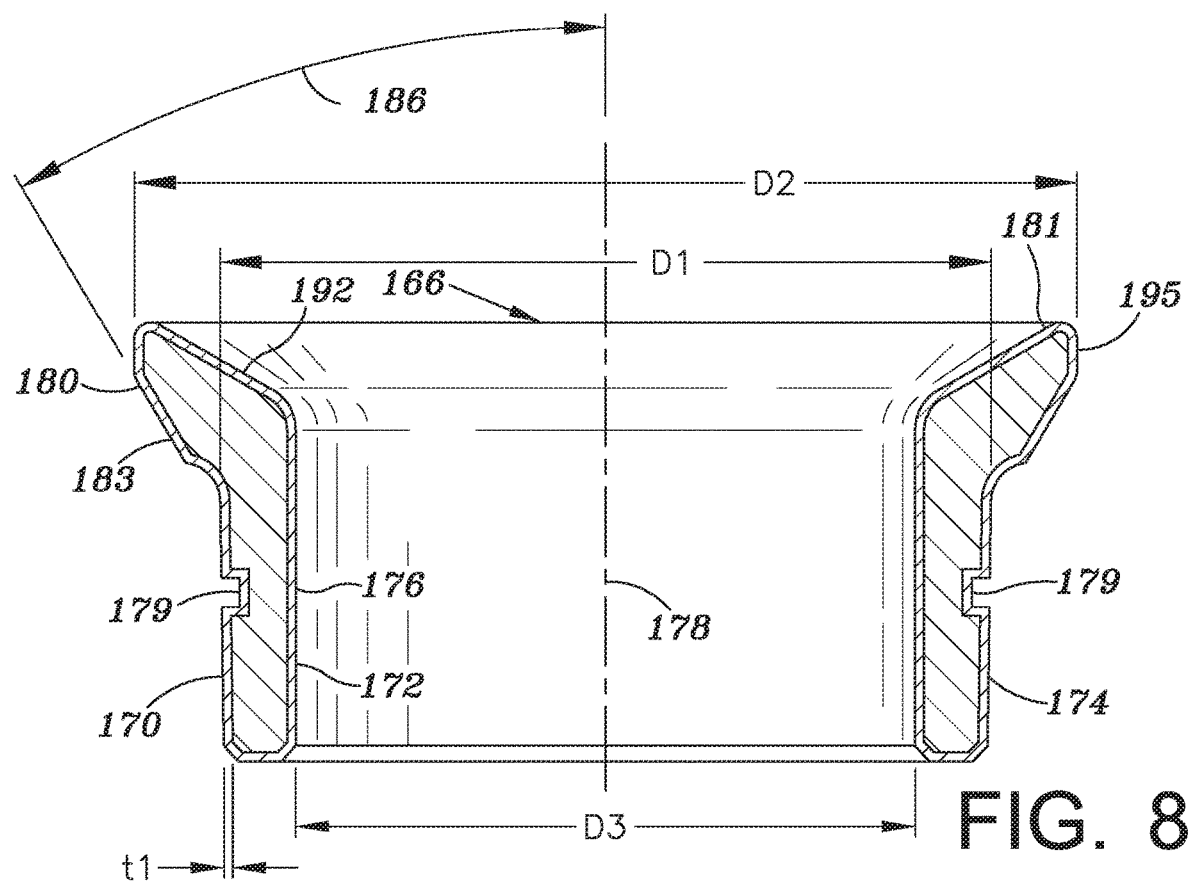
FIG. 8 is a cross-sectional view of a valve seat according to another exemplary embodiment.

According to embodiments disclosed herein, the ceramic insert 196 is secured by bonding, press-fitting, shrink-fitting, sintering, welding or combinations thereof. As shown in FIGS. 4-7 and 9, the ceramic insert 196 has a height, h1. In some embodiments, the height, h1, is between about 1/32 inches to about 1/2 inches. In other embodiments, the ceramic insert 196 is a coating 195 that is applied by dipping or spraying, having a thickness, t1, as shown in FIG. 8. In the embodiment illustrated in FIG. 8, the thickness, t1, is between about 1/32 inches and 1/2 inches, however, such thickness may vary.

The ceramic insert 196 is formed of different shapes and sizes, and additionally and/or alternatively, may be a coating as shown in FIG. 8. The ceramic insert 196 is positioned in areas of high erosion and pitting. The size, shape, and placement of the ceramic insert 196 depends on the operational environment. The ceramic insert 196 may be sized, shaped, or placed based on areas of the valve assembly 144 that are subject to the most erosion or pitting. Likewise, variances in operational, ambient, or environmental temperatures, along with the operational forces applied to and/or otherwise acting on the insert 196 (e.g., the tensile and compressive forces) may affect the size, shape or placement of the ceramic insert 196. According to some embodiments, the ceramic insert 196 spans the entire inner surface 181 of the tapered shoulder 180. In one embodiment, the ceramic insert 196 only spans a portion of the inner surface 181 of the tapered shoulder 180.

Figure 5:
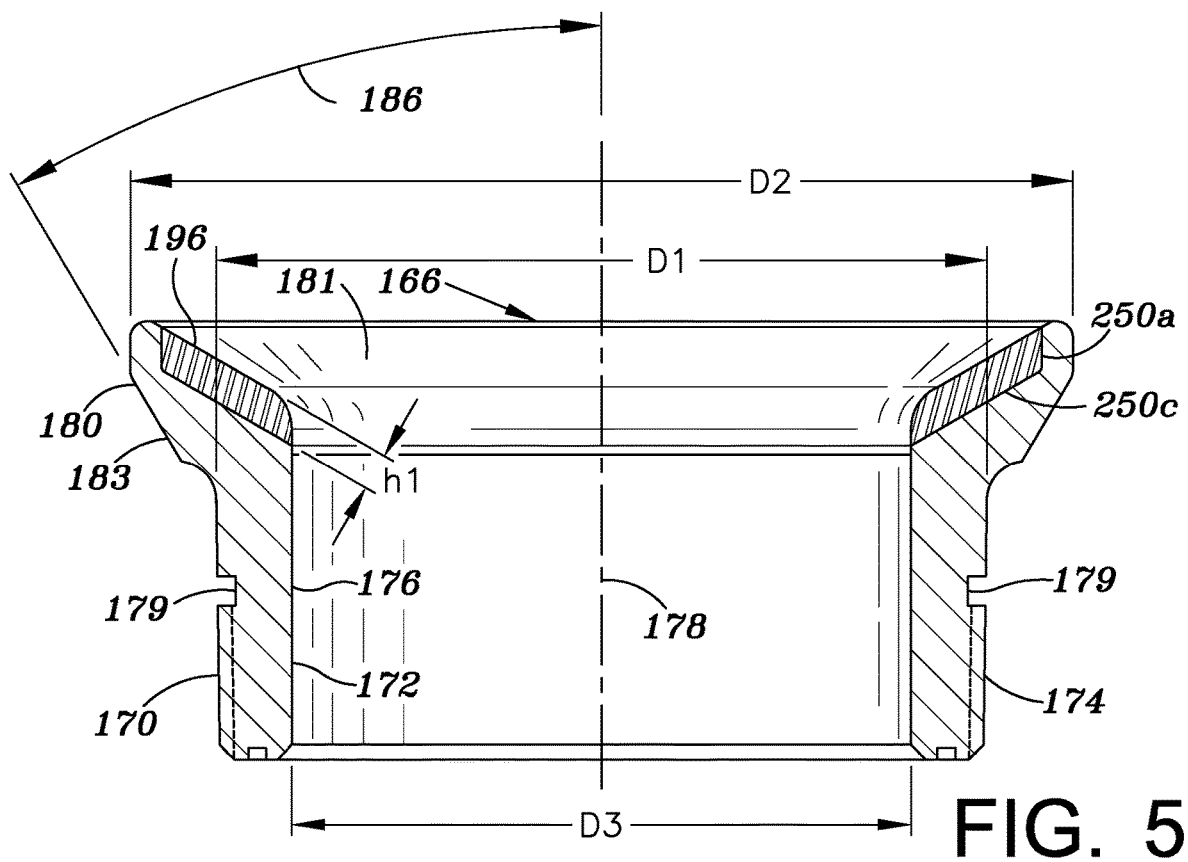
FIG. 5 is a cross-sectional view of a valve seat according to another exemplary embodiment.

FIG. 4 illustrates the ceramic insert 196 positioned in the valve seat 166. The ceramic insert 196 is illustrated within a cavity 250 formed in the valve seat 166 by sidewalls 250a, 250b and 250c. In one embodiment, the contact surface 196c of the ceramic insert 196 is flush with the surrounding contact surface 166c of the valve seat 166. In one embodiment (not shown), the contact surface 196c of the ceramic insert 196 is raised relative to the contact surface 166c of the valve seat 166. The ceramic insert 196 may be bonded in place. FIG. 5 illustrates the ceramic insert 196 positioned in the valve seat 166 and surrounded by only two sides 250a and 250c of the valve seat 166.

Figure 6:
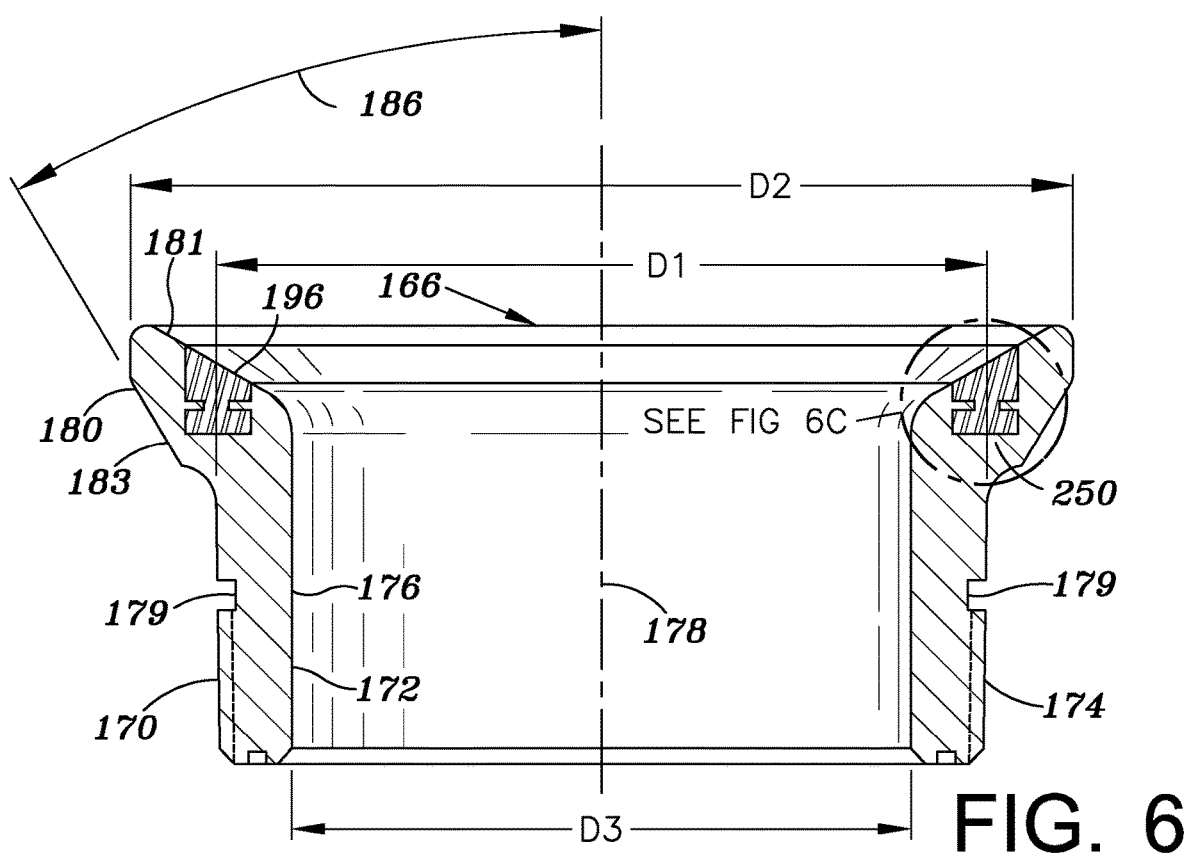
FIG. 6 is a cross-sectional view of a valve seat according to yet another exemplary embodiment.

FIGS. 6 and 6C illustrate the ceramic insert 196 having an "I-beam" shape disposed within the cavity 250 so as to be surrounded by the valve seat 166. An embodiment provides that the complicated shape of the ceramic insert 196 shown in FIGS. 6 and 6C, may be secured in the surrounding valve seat 166 by process of sintering.

FIGS. 7 and 7C illustrate the ceramic insert 196 having an "I-beam shape" positioned within a groove 198. An o-ring 199 is positioned around the ceramic insert 196 to help keep the ceramic insert 196 in place. The ceramic insert 196 may be bonded, shrink-fitted, or press-fitted into the groove 198.

Figure 9:
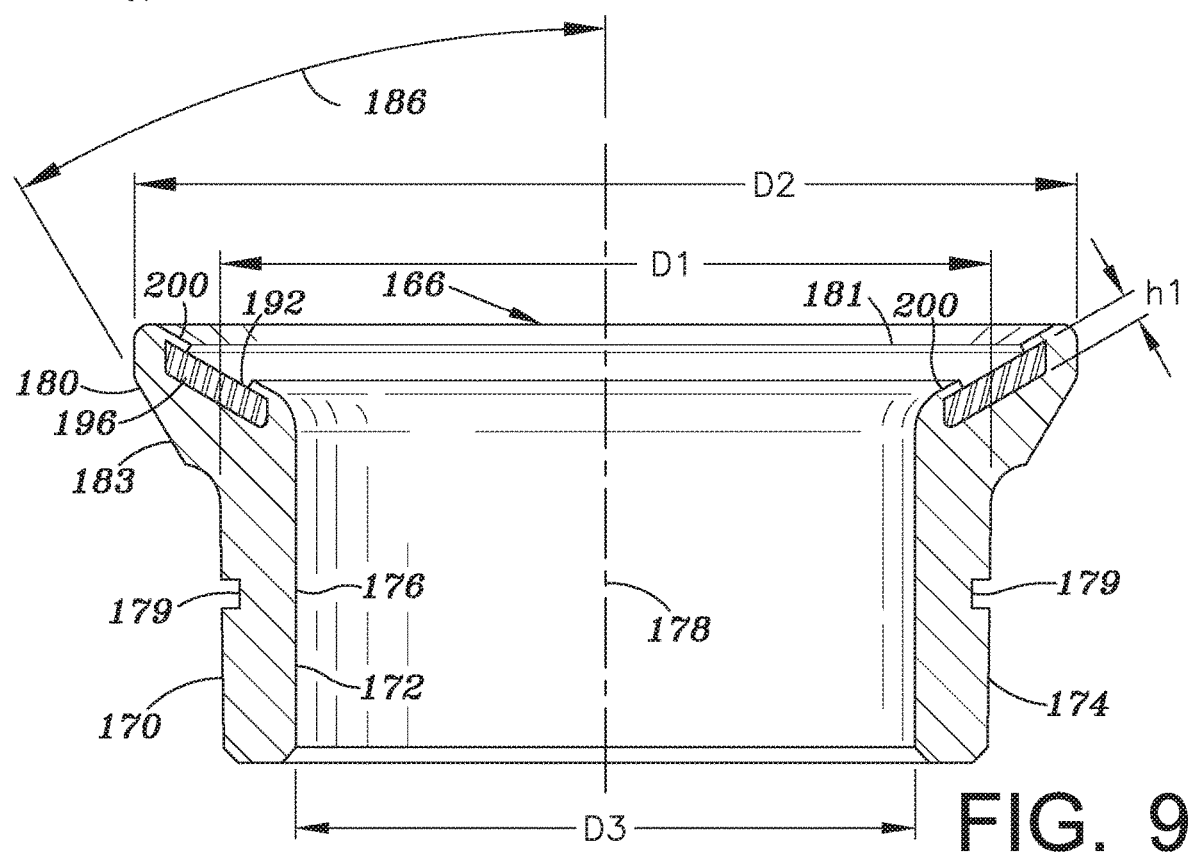
FIG. 9 is a cross-sectional view of a valve seat according to another exemplary embodiment.

FIG. 9 illustrates the ceramic insert 196 held within the valve seat 166 by tabs 200. The ceramic insert 196 is position within the valve seat 166 by way of sintering. The ceramic insert 196 extends underneath the tabs 200 and may provide support beneath the tabs.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A high pressure fracturing pump, the fracturing pump comprising:
    a fluid end;
    a power end secured to the fluid end, the power end positioned to reciprocate a plunger rod assembly within the fluid end;
    the fluid end supporting a valve assembly therein, the valve assembly having a valve member reciprocatably movable into and out of engagement with a valve seat body in response to the reciprocating movement of the plunger rod assembly, the valve seat body including:
        an inner surface forming a fluid bore and an outer surface extending between a first end and a second end of the valve assembly, the outer surface supporting the valve seat body in a fluid passageway of the fluid end;
        a seating surface configured to sealingly engage the valve member in response to the engagement of the valve member with the valve seat body, the seating surface angularly extending in a radial direction away from the inner surface;
        a recessed area formed in at least a portion of the seating surface and a least a portion of the inner surface;
        an insert disposed within the recessed area, the insert having an inner wall and an outer diameter length greater than an outer diameter length of the recessed area prior to positioning the insert into the recessed area such that when the insert is positioned in the recessed area, the insert is frictionally secured inside the recessed area and the insert inner wall is aligned with the inner surface of the fluid bore, the insert sized such that at least a portion of the seating surface contacts the valve member when the valve assembly is in a closed position; and
        wherein the valve seat body first end has a diameter D1 and the valve seat body second end has a diameter D2 such that that a difference between the diameters of D2 and D1 allow the valve seat body outer surface to be supported in the fluid end fluid passageway.

2. The insert of claim 1, wherein the insert is formed having a hardness greater than a hardness of the seating surface of the valve seat body.

3. The valve assembly of claim 1, wherein the valve member includes a sealing surface, the sealing surface angularly extending in a direction parallel to the seating surface so as to sealingly engage the seating surface in response to the reciprocating movement of the valve member.

4. The valve assembly of claim 1, wherein the insert is fixed to the valve seat body by a shrink-fit.

5. The valve assembly of claim 1, wherein the insert has a height, h1, between approximately 1/32 inches to 1/2 inches.

6. The valve assembly of claim 1, wherein the valve member is configured to reciprocate into and out of engagement with a valve seat body in response to the reciprocating movement of a plunger rod assembly generating operating pressures in excess of 10,000 psi.

7. The valve assembly of claim 1, wherein the insert is formed of tungsten carbide.

8. The fluid end of claim 1, further comprising a fluid inlet passage and a fluid outlet passage, each of the inlet and outlet passages supporting a valve assembly to control the flow of fluid through the inlet and outlet passages in response to reciprocating movement of the plunger rod assembly.

9. The fluid end of claim 1, further comprising a fluid inlet passage and a fluid outlet passage, at least one of the inlet and outlet passages supporting a valve assembly to control the flow of fluid therethrough.

10. A valve assembly for use in a fluid end of a high pressure fracturing pump, the high pressure fracturing pump having a fluid end and a power end, the power end positioned to reciprocate a plunger rod inside the fluid end, the valve assembly comprising:
   a valve member reciprocatably movable into and out of engagement with a valve seat body in response to the reciprocating movement of a plunger rod assembly,
   wherein the valve assembly is configured to operate at pressures in excess of 10,000 psi, the valve seat body including:
   an inner surface forming a fluid bore and an outer surface extending between a first end and a second end of the valve assembly, the outer surface supporting the valve seat body in a fluid passageway of the fluid end;
   a seating surface configured to sealingly engage the valve member in response to the engagement of the valve member with the seat body, the seating surface angularly extending in a radial direction away from the inner surface;
   a recessed area formed in at least a portion of the seating surface and a least a portion of the inner surface;
   an insert disposed within the recessed area, the insert having an outer diameter length greater than an outer diameter length of recessed area prior to insertion into the recessed area such that when the insert is disposed in the recessed area, the insert is frictionally secured inside the recessed area and forming at least a portion of the seating surface contacting the valve member when the valve assembly is in a closed position; and
   wherein the valve seat body first end has a diameter D1 and the valve seat body second end has a diameter D2 such that that the difference between D2 and D1 allows the valve seat body outer surface to be longitudinally supported by the fluid end fluid passageway.

11. The insert of claim 10, wherein the insert is formed having a hardness greater than a hardness of the seating surface of the valve seat body.

12. The valve assembly of claim 10, wherein the insert has an inner surface that is in the same plane as a plane of the fluid bore inner surface.

13. The valve assembly of claim 10, wherein the valve member includes a plurality of circumferentially-spaced legs to slidably engage the fluid bore inner surface.

14. The valve assembly of claim 10 wherein the insert is fixed to the valve seat body by a shrink-fit.

15. The valve assembly of claim 10, wherein the insert has a height, h1, between approximately 1/32 inches to 1/2 inches.

16. The valve assembly of claim 10, wherein the insert is formed of a ceramic.

17. The valve assembly of claim 10, wherein the insert is formed of tungsten carbide.

18. A fluid end and for a high pressure fracturing pump, the fluid end configured to reciprocatingly receive a plunger rod assembly, the fluid end comprising:
   a valve assembly disposed within a fluid passageway of the fluid end, the valve assembly including a valve member reciprocatably movable into and out of engagement with a valve seat body in response to the reciprocating movement of the plunger rod assembly generating operating pressures of at least 10,000 psi acting on at least a portion of the valve assembly, the valve seat body including:
   an inner surface forming a fluid bore and an outer surface extending between a first end and a second end of the valve assembly, the outer surface supporting the valve seat body in the fluid end fluid passageway;
   a seating surface configured to sealingly engage a corresponding sealing surface of the valve member in response to the engagement of the valve member sealing surface with the seat body seating surface, the seating surface and sealing surfaces angularly extending in a radial direction away from the inner surface of the valve seat body;
   a recessed area formed in at least a portion of the seating surface and a least a portion of the inner surface;
   an insert disposed within the recessed area, the insert having an insert inner wall and an insert outer wall, the insert having an outer diameter length greater than an outer diameter length of recessed area prior to insertion into the recessed area such that when the insert is disposed in the recessed area, the insert is frictionally secured inside the recessed area such that the inner insert wall forms a portion of the valve seat body fluid bore; and
   wherein the valve seat body first end has a diameter D1 and the valve seat body second end has a diameter D2 such that that the difference between D2 and D1 allows the valve seat body outer surface to be supported in the fluid end fluid passageway.

19. The valve assembly of claim 18, wherein the insert is formed of tungsten carbide.

20. The valve assembly of claim 18, wherein the insert is fixed to the valve seat body by a shrink-fit.

* * * * *